United States Patent
Liu et al.

(10) Patent No.: US 12,512,457 B2
(45) Date of Patent: Dec. 30, 2025

(54) LITHIUM ION BATTERY

(71) Applicant: ZHUHAI COSMX BATTERY CO., LTD., Zhuhai (CN)

(72) Inventors: Fen Liu, Zhuhai (CN); Chong Peng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/034,578

(22) Filed: Jan. 23, 2025

(65) Prior Publication Data

US 2025/0210622 A1 Jun. 26, 2025

Related U.S. Application Data

(63) Continuation of application No. 18/145,657, filed on Dec. 22, 2022, which is a continuation of application No. PCT/CN2021/105605, filed on Jul. 9, 2021.

(30) Foreign Application Priority Data

Dec. 28, 2020 (CN) .......................... 202023228745.3

(51) Int. Cl.
| | | |
|---|---|---|
| H01M 4/13 | (2010.01) | |
| H01M 4/02 | (2006.01) | |
| H01M 4/36 | (2006.01) | |
| H01M 4/62 | (2006.01) | |
| H01M 10/0525 | (2010.01) | |
| H01M 10/0587 | (2010.01) | |
| H01M 50/531 | (2021.01) | |
| H01M 50/586 | (2021.01) | |
| H01M 50/59 | (2021.01) | |

(52) U.S. Cl.
CPC .............. *H01M 4/13* (2013.01); *H01M 4/366* (2013.01); *H01M 4/62* (2013.01);
(Continued)

(58) Field of Classification Search
None
See application file for complete search history.

(56) References Cited

U.S. PATENT DOCUMENTS

2004/0202928 A1* 10/2004 Miyamoto ........ H01M 10/0431
429/246
2007/0048613 A1* 3/2007 Yanagida ............. H01M 4/662
429/245
(Continued)

FOREIGN PATENT DOCUMENTS

JP 2013206743 A * 10/2013

OTHER PUBLICATIONS

JP2013206743A—machine translation (Year: 2013).*

*Primary Examiner* — Haroon S. Sheikh
(74) *Attorney, Agent, or Firm* — K&L Gates LLP

(57) ABSTRACT

Disclosed is a lithium ion battery. The lithium ion battery includes a positive electrode plate, a negative electrode plate and a separator. The positive electrode plate, the separator and the negative electrode plate are stacked successively and then wound from inside to outside. The positive electrode plate includes a positive electrode current collector. At least one functional surface of the positive electrode current collector is provided with a protective layer. A surface of the protective layer away from the positive electrode current collector is provided with a positive electrode active layer. A length of the protective layer is greater than a length of the positive electrode active layer in a winding direction of the positive electrode current collector. According to the present application, by increasing a protection area of the protective layer for a positive electrode current collector, safety performance of the lithium ion battery is improved.

15 Claims, 5 Drawing Sheets

Winding direction of the positive electrode current collector

(52) U.S. Cl.
CPC ... *H01M 10/0525* (2013.01); *H01M 10/0587* (2013.01); *H01M 50/531* (2021.01); *H01M 50/586* (2021.01); *H01M 50/59* (2021.01); *H01M 2004/021* (2013.01); *H01M 2004/027* (2013.01); *H01M 2004/028* (2013.01)

(56) References Cited

U.S. PATENT DOCUMENTS

| | | | | |
|---|---|---|---|---|
| 2010/0285342 | A1* | 11/2010 | Lee | H01M 10/4235 429/94 |
| 2013/0224587 | A1* | 8/2013 | Uemura | C09D 5/24 429/211 |
| 2014/0072877 | A1* | 3/2014 | Araki | H01M 10/052 29/623.5 |
| 2016/0093922 | A1* | 3/2016 | Endo | H01M 10/4235 429/233 |
| 2019/0393511 | A1* | 12/2019 | Zhou | H01M 10/0431 |
| 2020/0006778 | A1* | 1/2020 | Endo | H01M 4/485 |
| 2020/0020921 | A1* | 1/2020 | Shiozaki | H01M 10/0525 |
| 2020/0020924 | A1* | 1/2020 | Takezawa | H01M 4/661 |
| 2020/0052348 | A1* | 2/2020 | Oura | H01M 4/625 |
| 2020/0083538 | A1* | 3/2020 | Torita | H01M 4/62 |
| 2020/0144624 | A1* | 5/2020 | Zheng | H01M 10/4235 |
| 2022/0093932 | A1* | 3/2022 | Li | H01M 4/661 |
| 2024/0186484 | A1* | 6/2024 | Lin | H01M 10/4235 |
| 2024/0322371 | A1* | 9/2024 | Woo | H01M 4/661 |

* cited by examiner

Winding direction of the positive electrode current collector

Winding direction of the positive electrode current collector

Winding direction of the positive electrode current collector

Winding direction of the positive electrode current collector

Winding direction of the positive electrode current collector

Winding direction of the positive electrode current collector

Winding direction of the positive electrode current collector

Winding direction of the positive electrode current collector

Winding direction of the positive electrode current collector

Winding direction of the positive electrode current collector

Winding direction of the positive electrode current collector

Winding direction of the positive electrode current collector

LITHIUM ION BATTERY

CROSS-REFERENCES TO RELATED APPLICATIONS

This application is a continuation of U.S. patent application Ser. No. 18/145,657, filed Dec. 22, 2022, which is a continuation of International Patent Application No. PCT/CN2021/105605, filed Jul. 9, 2021, which claims the priority to Chinese Patent Application No. 202023228745.3, filed Dec. 28, 2020. The disclosures of the aforementioned applications are hereby incorporated by reference in their entireties for all purposes.

BACKGROUND OF THE INVENTION

The disclosure relates to a lithium ion battery, belonging to a field of a secondary battery technology.

A lithium ion battery has numerous advantages including a high energy density, a high working voltage, a light weight and a small size. In addition, the lithium ion battery has a long cycle life and is environment-friendly, which are also necessary conditions for the lithium ion battery to be widely used. Since the 1990s, the lithium ion battery has been applied in daily electronic products, electric vehicles and other energy storage power systems more and more widely. However, due to particularities of materials used in the lithium ion battery and a structure of the lithium ion battery, there are still many safety risks. Especially when the lithium ion battery is pierced by hard objects or impacted by heavy objects, there is a great risk in safety of the lithium ion battery. In recent years, explosions and spontaneous combustion of the lithium ion battery reported by medium keep happening. People's requirements for safety performance of the lithium ion battery are also getting higher and higher. The safety has become one of most important reasons restricting a large-scale industrial application of the lithium ion battery. How to improve the safety of the lithium ion battery has become an urgent problem to be solved in the field of the lithium ion battery at home and abroad.

SUMMARY OF THE INVENTION

The disclosure provides a lithium ion battery, including a positive electrode plate, a negative electrode plate and a separator. By increasing a protection area of a protective layer on a surface of a positive electrode current collector, it is helpful to reduce a contact risk between the positive electrode current collector and a negative electrode active substance during a needling process, improve mechanical strength of the positive electrode current collector, prevent the positive electrode current collector from being teared in a process of impact by heavy objects, reduce a safety risk of the lithium ion battery in the needling process and the process of impact by heavy objects, and improve safety performance of the lithium ion battery.

The disclosure provides a lithium ion battery, including a positive electrode plate, a negative electrode plate and a separator. The positive electrode plate, the separator and the negative electrode plate being stacked successively and then wound from inside to outside.

The positive electrode plate includes a positive electrode current collector. At least one functional surface of the positive electrode current collector is provided with a protective layer. A surface of the protective layer away from the positive electrode current collector is provided with a positive electrode active layer. A length of the protective layer is greater than a length of the positive electrode active layer in a winding direction of the positive electrode current collector.

According to the lithium ion battery described above, at least one functional surface of the positive electrode current collector includes an active layer region and further includes a first end region and/or a second end region.

The protective layer includes a conductive protective layer. The conductive protective layer is disposed on the first end region and/or the second end region, and the active layer region. A surface of the conductive protective layer disposed on the active layer region away from the positive electrode current collector is provided with the positive electrode active layer.

According to the lithium ion battery described above, the protective layer further includes an insulating protective layer. The insulating protective layer is disposed on a surface of the conductive protective layer disposed on the first end region and/or the second end region away from the positive electrode current collector.

According to the lithium ion battery described above, the protective layer includes an inorganic filler. A $D_{50}$ of the inorganic filler is less than a $D_{50}$ of an active substance in the positive electrode active layer.

According to the lithium ion battery described above, the inorganic filler includes a transition metal oxide containing lithium and/or a ceramic material.

According to the lithium ion battery described above, the transition metal oxide containing lithium is one or more selected from lithium cobaltate, nickel-cobalt-manganese ternary material, nickel-cobalt-aluminum ternary material, nickel-cobalt-manganese-aluminum quaternary material, lithium ferric phosphate, lithium manganese phosphate, lithium vanadium phosphate, lithium manganese oxide, and lithium-rich manganese-based.

The ceramic material is one or more selected from aluminium oxide, boehmite, zirconium dioxide, titanium dioxide, silicon dioxide, montmorillonite, magnesium oxide and magnesium hydroxide.

According to the lithium ion battery described above, a bonding force between the protective layer and the positive electrode current collector is greater than a bonding force between the protective layer and the positive electrode active layer;

and/or, the bonding force between the protective layer and the positive electrode current collector is greater than a bonding force between particles of the active substance in the positive electrode active layer.

According to the lithium ion battery described above, a mass fraction of a binder in the protective layer is greater than a mass fraction of a binder in the positive electrode active layer.

According to the lithium ion battery described above, after the protective layer is stripped from a surface of the positive electrode current collector, total mass of a residual protective layer on the positive electrode current collector accounts for more than 10% of total mass of the protective layer on the positive electrode current collector before stripping.

According to the lithium ion battery described above, after the protective layer is stripped from a surface of the positive electrode current collector, total area of a residual protective layer on the positive electrode current collector accounts for more than 70% of total area of the protective layer on the positive electrode current collector before stripping.

According to the lithium ion battery described above, the conductive protective layer includes 50%-98% of an inorganic filler, 0.5%-10% of a first conductive agent and 1.5%-50% of a first binder by a mass percentage.

According to the lithium ion battery described above, the insulating protective layer includes 50%-96% of a ceramic material and 4%-50% of a second binder by a mass percentage.

According to the lithium ion battery described above, a thickness of the protective layer is 1%-50% of a thickness of the positive electrode active layer.

According to the lithium ion battery described above, a thickness of the conductive protective layer disposed on the first end region ranges from 1 μm to 25 μm, a thickness of the conductive protective layer disposed on the second end region ranges from 1 μm to 25 μm, and a thickness of the conductive protective layer disposed on the active layer region ranges from 1 μm to 10 μm.

According to the lithium ion battery described above, the thickness of the conductive protective layer disposed on the first end region and/or the second end region and the thickness of the conductive protective layer disposed on the active layer region is the same.

According to the lithium ion battery described above, a thickness of the insulating protective layer disposed on a surface of the conductive protective layer disposed on the first end region away from the positive electrode current collector ranges from 1 μm to 15 μm. A thickness of the insulating protective layer disposed on a surface of the conductive protective layer disposed on the second end region away from the positive electrode current collector ranges from 1 μm to 15 μm.

According to the lithium ion battery described above, at least one functional surface of the positive electrode current collector includes an installation region exposing the positive electrode current collector, and the installation region is connected to a side of the positive electrode current collector.

According to the lithium ion battery described above, the positive electrode plate further includes a positive battery tab, the positive battery tab is disposed on the installation region on a functional surface of the positive electrode current collector, and a side of the installation region close to a winding center and a side of the installation region away from the winding center are both provided with the protective layer According to the lithium ion battery described above, the first end region along the winding direction of the positive electrode current collector includes a first flat region, an installation region, a second flat region, a third flat region and a first arc region. The installation region is provided with a positive battery tab, a surface of the positive electrode plate is pasted with a first taping, and the first taping is bonded with a surface of the protective layer disposed on the third flat region, a surface of the protective layer disposed on the first arc region and at least part of a surface of the positive electrode active layer disposed on the active layer region.

According to the lithium ion battery described above, the second end region along the winding direction of the positive electrode current collector includes a second arc region and a fourth flat region. A surface of the positive electrode plate is pasted with a second taping, and the second taping is bonded with at least part of a surface of the positive electrode active layer disposed on the active layer region, a surface of the protective layer disposed on the second arc region and at least part of a surface of the protective layer disposed on the fourth flat region.

According to the lithium ion battery described above, at least one functional surface of the positive electrode current collector includes an empty foil region. The empty foil region is disposed on an end of the second end region away from a winding center, and a surface of the empty foil region is not provided with the protective layer.

According to the lithium ion battery described above, neither of two functional surfaces at an end of the positive electrode current collector away from a winding center includes an empty foil region.

According to the lithium ion battery described above, the negative electrode plate includes a negative electrode current collector and a negative electrode active layer disposed on at least one functional surface of the negative electrode current collector, and a length of the negative electrode active layer is greater than a length of the positive electrode active layer.

According to the lithium ion battery described above, the at least one functional surface of the negative electrode current collector includes an empty foil region. The empty foil region is disposed on an end of the negative electrode current collector away from a winding center, and a surface of the empty foil region is not provided with the negative electrode active layer.

According to the lithium ion battery described above, neither of two functional surfaces at an end of the negative electrode current collector away from a winding center includes an empty foil region.

The lithium ion battery provided by the present disclosure includes a positive electrode plate, a negative electrode plate and a separator, which are stacked successively and then wound. The surface of the positive electrode plate is provided with a protective layer, and the length of the protective layer is greater than the length of the positive electrode active layer. On one hand, by increasing the area of the protective layer disposed on the positive electrode current collector, the risk of short circuit caused by contact between the negative electrode active material and the positive electrode current collector during a needling may be reduced, thereby improving the safety performance of the positive electrode plate during the needling. On the other hand, by increasing the area of the protective layer disposed on a functional surface of the positive electrode current collector, the mechanical strength of the positive electrode current collector may be enhanced, which may prevent that the positive electrode current collector is teared when the positive electrode plate is impacted by heavy objects, thereby prolonging a service life of the positive electrode current collector, reducing risks of a failure of positive electrode plate and a potential safety hazard which may occur when the positive electrode plate is impacted by heavy objects. Therefore, the lithium ion battery including the positive electrode plate described above has a more excellent safety performance, and may further meet current requirements for the safety performance of the lithium ion battery.

In addition, a preparation process of the lithium ion battery in the present disclosure is simple and easy to execute without assistance of a large-scale instrument, and is compatible with an existing production process, thereby significantly improving the safety of the lithium ion battery during the needling and the heavy impact at low costs. Therefore, it is also easy to be widely spread in an industrial application.

It is worth mentioning that according to the present disclosure, by disposing a protective layer on the surface of a current collector, adhesion between the positive electrode current collector and separator may be increased, an infiltration ability of electrolyte to the positive electrode plate may be improved, and a charge-discharge performance of the positive electrode plate may be improved. Therefore, the lithium ion battery according to the present disclosure, which includes a positive electrode plate with a more excellent charge-discharge performance, has a more excellent charge-discharge characteristic, so that it can better meet the requirements for the comprehensive performance of the lithium ion battery.

DETAILED DESCRIPTION OF THE EMBODIMENTS

Figure 1:
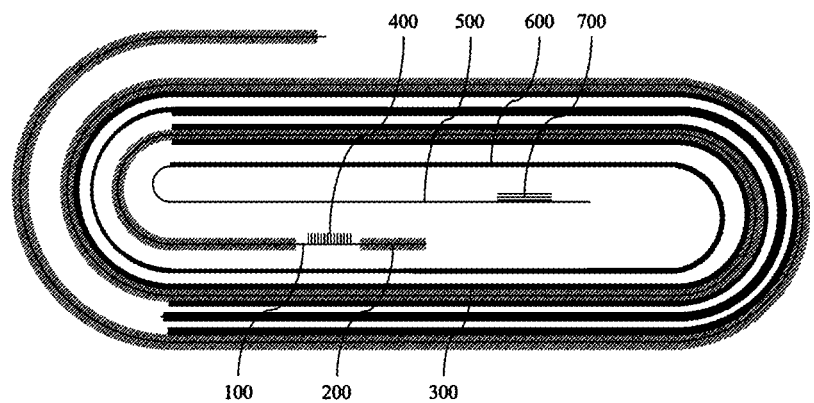
FIG. 1 is a structural schematic diagram of Embodiment 1 of a lithium ion battery according to the present disclosure.

In order to make the purpose, technical solution and advantages of the present disclosure clearer, the technical solution of the present disclosure will be clearly and completely described below with reference to the embodiments of the present disclosure. Apparently, the embodiments described above are merely some but not all of the embodiments of the present disclosure. All other embodiments obtained by those skilled in the art based on the embodiments of the present disclosure without creative efforts fall within the protection scope of the present disclosure.

There are four models of short circuit that may occur when the lithium ion battery is pierced by sharp objects, including a short circuit between a positive electrode active material and a negative electrode active substance, a short circuit between a positive electrode active substance and a negative electrode current collector, a short circuit between a positive electrode current collector and a negative electrode current collector and a short circuit between a positive electrode current collector and a negative electrode active substance. The short circuit between the positive electrode current collector and negative electrode active substance has a maximum power and may produce a large amount of heat in an instant, thus becoming a most dangerous model of short circuit. In order to prevent the short circuit between the positive electrode current collector and the negative electrode active substance and the heat generated thereby, in prior art, it is usually to coat the positive electrode current collector with double layers, that is, firstly coat the positive electrode current collector with a layer of a protective layer, and then coat a surface of the protective layer away from the positive electrode current collector with a positive electrode active substance layer to cover the protective layer. The protective layer may effectively protect the positive electrode current collector, prevent contact between the positive electrode current collector and the negative electrode active material during a needling process. However, a protective effect of the protective layer in the prior art is limited and there is still a contact risk between the positive electrode current collector and the negative electrode active substance. In addition, the positive electrode current collector tends to have low mechanical strength and weak adhesion with a separator. When the lithium ion battery is impacted by heavy objects, the positive electrode current collector is easy to be teared, which leads to a failure of the lithium ion battery.

How to prevent a short circuit of the lithium ion battery between the positive electrode current collector and the negative electrode active substance during a needling process, reduce a risk of tearing of the positive electrode current collector when the lithium ion battery is impacted by heavy objects, and improve safety performance of the lithium ion battery are urgent problems to be solved in the field of the lithium ion battery.

The present disclosure provides a lithium ion battery, including a positive electrode plate, a negative electrode plate and a separator. The positive electrode plate, the separator and the negative electrode plate are stacked successively and then wound from inside to outside.

The positive electrode plate includes a positive electrode current collector. At least one functional surface of the positive electrode current collector is provided with a protective layer. A surface of the protective layer away from the positive electrode current collector is provided with a positive electrode active layer. A length of the protective layer is greater than a length of the positive electrode active layer in a winding direction of the positive electrode current collector.

FIG. 1 is a structural schematic diagram of Embodiment 1 of a lithium ion battery according to the present disclosure. As shown in FIG. 1, the lithium ion battery includes a positive electrode plate, a separator (not shown in the figure) and a negative electrode plate. The positive electrode plate, the separator and the negative electrode plate are stacked successively, and the separator is located between the positive electrode plate and negative electrode plate so that the positive electrode plate and the negative electrode plate are insulated from contact to prevent a short circuit of the lithium ion battery. Then, the stacked structure of the positive electrode plate, the separator and the negative electrode plate is wound from one end along a length direction to obtain the lithium ion battery according to a design of lithium ion battery. The positive electrode plate includes a positive electrode current collector 100, a protective layer 200 and a positive electrode active layer 300. Generally speaking, the positive electrode current collector is a thin sheet. A functional surface of the positive electrode current collector refers to a plane formed by the length and the width of the current collector, specifically to an upper surface and a lower surface of the positive electrode current collector, which is used for loading the positive electrode active layer. At least one functional surface of the positive electrode current collector 100 is provided with the protective layer 200. A surface of the protective layer away from the positive electrode current collector 100 is provided with the positive electrode active layer 300. A length of the protective layer 200 is greater than a length of the positive electrode active layer 300, that is, protection area of the protective layer 200 on the surface of the positive electrode current collector 100 is increased. On one hand, by increasing the area of the protective layer disposed on the positive electrode current collector, the risk of short circuit caused by contact between the negative electrode active material and the positive electrode current collector during a needling may be reduced, thereby improving the safety performance of the lithium ion battery during the needling. On the other hand, by increasing the area of the protective layer disposed on a functional surface of the positive electrode current collector, the mechanical strength of the positive electrode current collector may be enhanced, which may prevent that the positive electrode current collector is teared when the positive electrode plate is impacted by heavy objects, thereby prolonging a service life of the positive electrode current collector, reducing risks of a failure of positive electrode plate and potential safety hazard which may occur when the positive electrode plate is impacted by heavy objects, and improving the safety performance of the lithium ion battery when the lithium ion battery is impacted by heavy objects. In conclusion, the lithium ion battery according to the present disclosure has a better safety performance.

Figure 2:
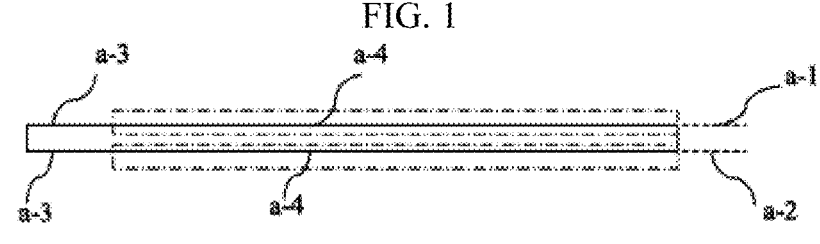
FIG. 2 is a structural schematic diagram of Embodiment 1 of a positive electrode current collector according to the present disclosure.
Figure 3:
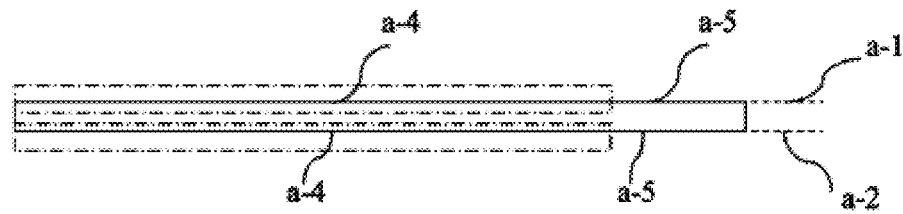
FIG. 3 is a structural schematic diagram of Embodiment 2 of a positive electrode current collector according to the present disclosure.
Figure 4:
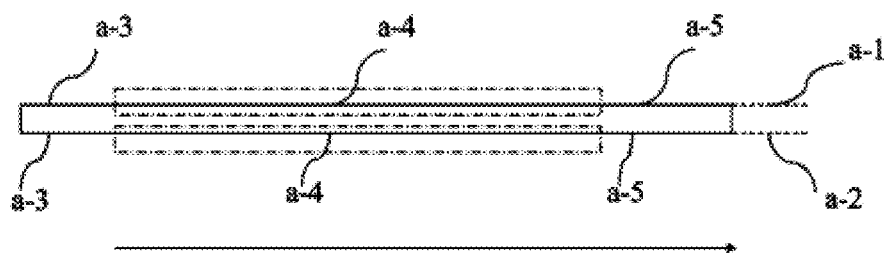
FIG. 4 is a structural schematic diagram of Embodiment 3 of a positive electrode current collector according to the present disclosure.

In a specific embodiment, at least one functional surface of the positive electrode current collector includes an active layer region and further includes a first end region and/or a second end region, that is, the at least one functional surface of the positive electrode current collector includes the first end region and the active layer region, or, the at least one functional surface of the positive electrode current collector includes the active layer region and the second end region, or the at least one functional surface of the positive electrode current collector includes the first end region, the active layer region and the second end region. The first end region and the second end region are separately located at two ends of the active layer region, that is, the first end region, the active layer region and the second end region are disposed on the functional surface of the positive electrode current collector along a winding direction of the positive electrode current collector successively. For example, FIG. 2 is a structural schematic diagram of Embodiment 1 of a positive electrode current collector according to the present disclosure. As shown in FIG. 2, the positive electrode current collector 100 has two functional surfaces, namely a first functional surface a-1 and a second functional surface a-2. And the first functional surface a-1 and the second functional surface a-2 respectively include a first end region a-3 and an active layer region a-4 along the winding direction, that is, the positive electrode current collector 100 may include two first end regions a-3, which are respectively located at the first functional surface a-1 of the positive electrode current collector 100 and the second functional surface a-2 of the positive electrode current collector 100. Two active layer regions a-4 are respectively located at the first functional surface a-1 of the positive electrode current collector 100 and the second functional surface a-2 of the positive electrode current collector 100. FIG. 3 is a structural schematic diagram of Embodiment 2 of a positive electrode current collector according to the present disclosure. As shown in FIG. 3, the first functional surface a-1 and the second functional surface a-2 of the positive electrode current collector 100 respectively include an active layer region a-4 and a second end region a-5 along the winding direction successively. FIG. 4 is a structural schematic diagram of Embodiment 3 of a positive electrode current collector according to the present disclosure. As shown in FIG. 4, the first functional surface a-1 and the second functional surface a-2 of the positive electrode current collector 100 respectively include the first end region a-3, the active layer region a-4 and the second end region a-5 along the winding direction successively. It is understandable that the first functional surface a-1 and the second functional surface a-2 may include the same or different regions. For example, the first functional surface a-1 may include the first end region a-3, the active layer region a-4, and the second end region a-5, and the second functional surface a-2 may include the first end region a-3 and the active layer region a-4. The specific configuration is determined according to an actual production situation.

The present disclosure does not impose strict restrictions on a material of the positive electrode current collector 100. For example, the material of the positive electrode current collector 100 may be aluminum foil.

The active layer region a-4 of the present disclosure refers to a region on the functional surface of the positive electrode current collector for disposing the positive electrode active layer. The positive electrode active layer contains an active material, which is used for generating and outputting an electric current in a process of charging and discharging. Accordingly, in the present disclosure, the first end region a-3 and the second end region a-5 are respectively located at the two ends of the active layer region a-4, and are regions on the functional surface of the positive electrode current collector 100 that is not used to load the positive electrode active layer 300.

The protective layer includes a conductive protective layer. The conductive protective layer is disposed on the first end region and/or the second end region, and the active layer region, and a surface of the conductive protective layer disposed on the active layer region away from the positive electrode current collector is provided with the positive electrode active layer.

Figure 5:
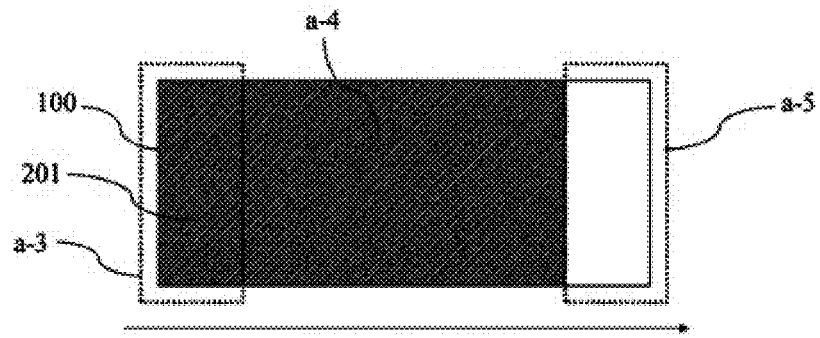
FIG. 5 is a structural schematic diagram of Embodiment 1 of a positive electrode plate according to the present disclosure.
Figure 6:
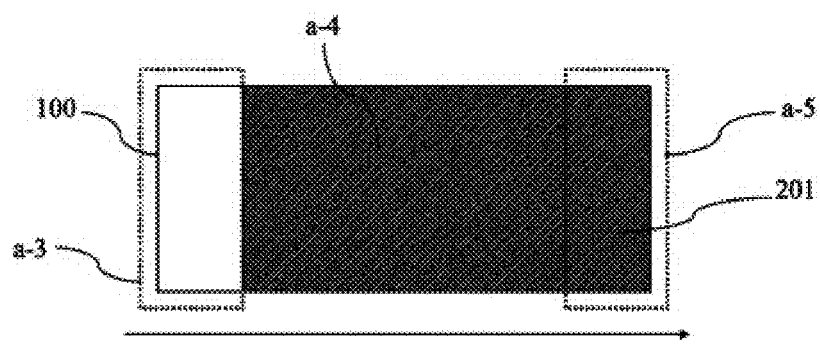
FIG. 6 is a structural schematic diagram of Embodiment 2 of a positive electrode plate according to the present disclosure.
Figure 7:
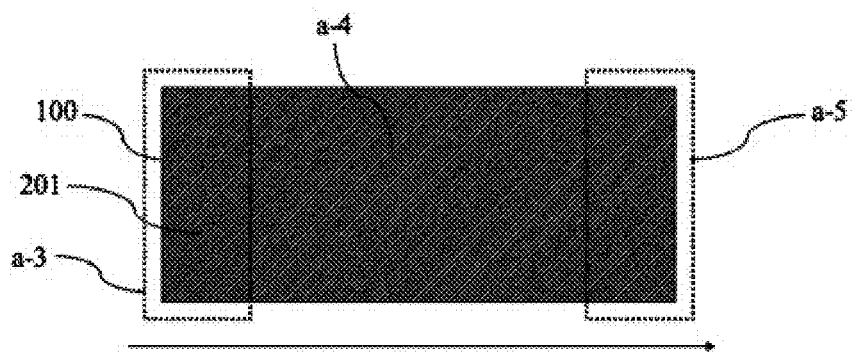
FIG. 7 is a structural schematic diagram of Embodiment 3 of a positive electrode plate according to the present disclosure.

FIG. 5 is a structural schematic diagram of Embodiment 1 of a positive electrode plate according to the present disclosure. As shown in FIG. 5, a functional surface of the positive electrode current collector includes a first end region a-3, an active layer region a-4 and a second end region a-5 along the winding direction. The first end region a-3 and the active layer region a-4 are provided with a conductive protective layer 201. FIG. 6 is a structural schematic diagram of Embodiment 2 of a positive electrode plate according to the present disclosure. As shown in FIG. 6, a functional surface of the positive electrode current collector includes a first end region a-3, an active layer region a-4 and a second end region a-5 along the winding direction. The active layer region a-4 and the second end region a-5 are provided with a conductive protective layer 201. FIG. 7 is a structural schematic diagram of Embodiment 3 of a positive electrode plate according to the present disclosure. As shown in FIG. 7, a functional surface of the positive electrode current collector includes a first end region a-3, an active layer region a-4 and a second end region a-5 along the winding direction. The first end region a-3, the active layer region a-4 and the second end region a-5 are provided with a conductive protective layer 201. Moreover, FIG. 5 to FIG. 7 are mainly used to illustrate arrangements of the conductive protective layer, none of which shows the positive electrode active layer which is disposed on a surface of the conductive protective layer 201 away from the positive electrode current collector 100. The first end region and the second end region of the surface of the conductive protective layer 201 is not provided with the positive electrode active layer 300.

It is worth emphasizing that when the first end region a-3, the active layer region a-4, and the second end region a-5 on one functional surface of the positive electrode current collector are provided with the protective layer, the other functional surface of the positive electrode current collector is not strictly restricted. For example, the other functional surface may not be provided with the protective layer. The first end region and/or the second end region, and the active layer region of the other functional surface may also be provided with the conductive protective layer.

It can be understood that, in addition to the above situation where the first end region and/or the second end region, and the active layer region on the functional surface of the positive electrode current collector 100 are provided with the conductive protective layer 201, the present disclosure further includes disposing the conductive protective layer 201 on two functional surfaces of the positive electrode current collector 100.

Figure 8:
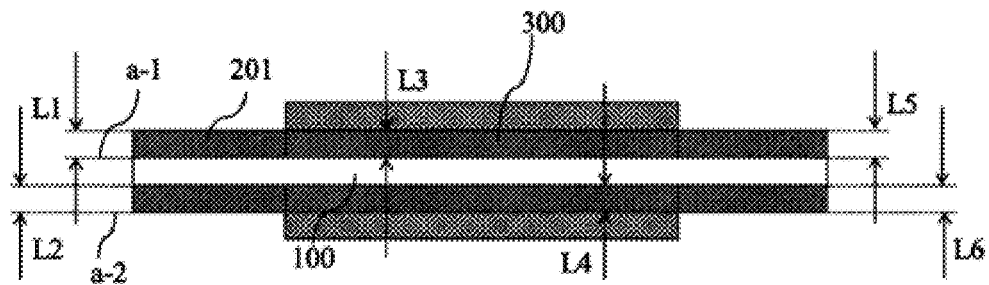
FIG. 8 is a structural schematic diagram of Embodiment 4 of a positive electrode plate according to the present disclosure.

FIG. 8 is a structural schematic diagram of Embodiment 4 of a positive electrode plate according to the present disclosure. In this embodiment, two functional surfaces of the positive electrode current collector 100 are both provided with a conductive protective layer. In this embodiment, two first end regions a-3, two active layer regions a-4 and two second end regions a-5 separately disposed on the first functional surface a-1 and the second functional surface a-2 of the positive electrode current collector 100 shown in FIG. 8 are all provided with the conductive protective layers 201. A surface of the conductive protective layer 201 disposed on the active layer region away from the positive electrode current collector 100 is provided with a positive electrode active layer 300. In other words, regions on the tow functional surfaces of the positive electrode current collector 100 with no positive electrode active layer are all provided with a protective layer, so that the positive electrode current collector may be protected to the maximum extent by the protective layer.

Along the winding direction of the positive electrode current collector, a length of the first end region a-3 located on the first functional surface a-1 and a length of the first end region a-3 located on the second functional surface a-2 may be the same or different. A length of the active layer region a-4 located on the first functional surface a-1 and a length of the active layer region a-4 located on the second functional surface a-2 may be the same or different. A length of the second end region a-5 located on the first functional surface a-1 and a length of the second end region a-5 located on the second functional surface a-2 may be the same or different.

In a specific implementation process, a design of the length of the first end region a-3, the active layer region a-4, and the second end region a-5 on different functional surfaces of the positive electrode current collector may be determined according to design requirements of the positive electrode plate. A configuration of the protective layer for the first end region a-3, the active layer region a-4, and the second end region a-5 on one or two functional surfaces of the positive electrode current collector 100 may be determined comprehensively according to safety requirements of the positive electrode plate, constructions of the positive electrode plate and production costs of the positive electrode plate.

According to the solution described above, in addition to disposing the conductive protective layer 201 at the active layer region a-4 of the positive electrode current collector of the positive electrode plate, the first end region a-3 and the second end region a-5 of the positive electrode current collector 100 of the positive electrode plate are also provided with the conductive protective layer 201, so that protection of the protective layer on the positive electrode current collector is further improved, mechanical strength of an inactive layer region of the positive electrode current collector is improved, a contact risk between the positive electrode current collector and the negative electrode active substance during a needling process is reduced, the positive electrode current collector is prevented from being teared when the positive electrode current collector is impacted by heavy objects, a safety risk of the positive electrode plate in the needling process and the process of impact by heavy objects is reduced, and safety performance of the lithium ion battery in the needling process and the process of impact by heavy objects is improved.

The present disclosure also does not impose strict restrictions on a method of forming the conductive protective layer 201 on the functional surface of positive electrode current collector. For example, in a specific implementation, the conductive protective layer 201 may be formed on the functional surface of positive electrode current collector 100 in one or more methods including a double coating, a gravure coating and a transfer coating.

It is understandable that, as the conductive protective layer need to be capable of conducting electricity, the conductive protective layer must contain conductive materials, such as a conductive agent. In order to further improve the safety of the lithium ion battery, the first end region and/or the second end region of the surface of the conductive protective layer away from the positive electrode current collector may be provided with an insulating protective layer. The insulating protective layer do not contain the conductive agent. In particular, the protective layer may further include an insulating protective layer. The insulating protective layer is disposed on a surface of the conductive protective layer disposed on the first end region and/or the second end region away from the positive electrode current collector.

Figure 9:
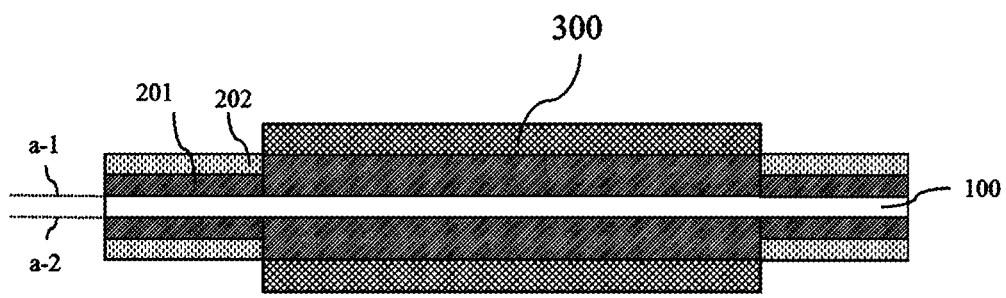
FIG. 9 is a structural schematic diagram of Embodiment 5 of a positive electrode plate according to the present disclosure.

FIG. 9 is a structural schematic diagram of Embodiment 5 of a positive electrode plate according to the present disclosure. As shown in FIG. 9, the positive electrode plate includes a positive electrode current collector 100, a conductive protective layer 201 disposed on a first end region, an active layer region and a second end region of the first functional surface a-1 of the positive electrode current collector, an insulation protective layer 202 disposed on a surface of the conductive protective layer 201 disposed on the first end region and/or the second end region away from the positive electrode current collector 100, and a positive electrode active layer 300 disposed on a surface of the conductive protective layer 201 disposed on the active layer region away from the positive electrode current collector 100. The second functional surface a-2 of the positive electrode current collector 100 is disposed in the same way as the first functional surface a-1.

Figure 10:
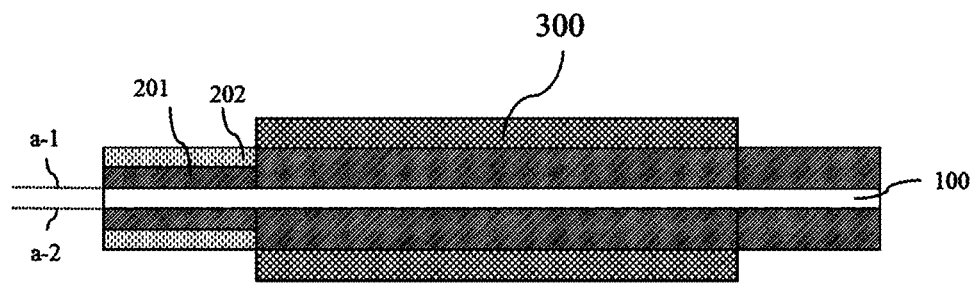
FIG. 10 is a structural schematic diagram of Embodiment 6 of a positive electrode plate according to the present disclosure.

FIG. 10 is a structural schematic diagram of Embodiment 6 of a positive electrode plate according to the present disclosure. As shown in FIG. 10, the positive electrode plate includes a positive electrode current collector 100, a conductive protective layer 201 disposed on a first end region, an active layer region and a second end region of the first functional surface a-1 of the positive electrode current collector, an insulation protective layer 202 disposed on a surface of the conductive protective layer 201 disposed on the first end region away from the positive electrode current collector 100, and a positive electrode active layer 300 disposed on a surface of the conductive protective layer 201 disposed on the active layer region away from the positive electrode current collector 100. The second functional surface a-2 of the positive electrode current collector 100 is disposed in the same way as the first functional surface a-1.

Figure 11:
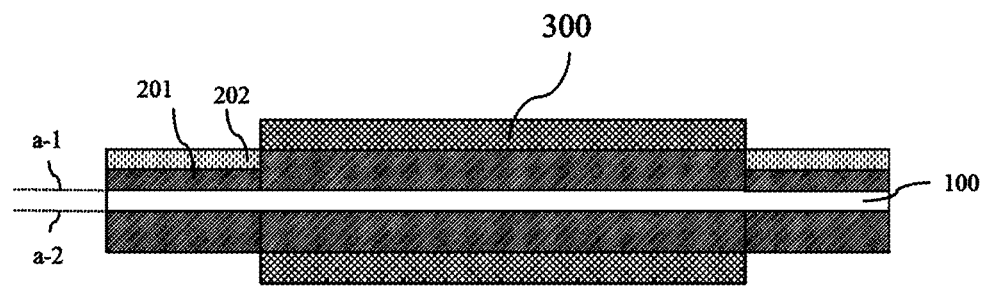
FIG. 11 is a structural schematic diagram of Embodiment 7 of a positive electrode plate according to the present disclosure.

FIG. 11 is a structural schematic diagram of Embodiment 7 of a positive electrode plate according to the present disclosure. As shown in FIG. 11, the positive electrode plate includes a positive electrode current collector 100, a conductive protective layer 201 disposed on a first end region, an active layer region and a second end region of the first functional surface a-1 of the positive electrode current collector, an insulation protective layer 202 disposed on a surface of the conductive protective layer 201 disposed on the first end region and/or the second end region away from the positive electrode current collector 100, and a positive electrode active layer 300 disposed on a surface of the conductive protective layer 201 disposed on the active layer region away from the positive electrode current collector 100. The first end region, the active layer region and the second end region of the second functional surface a-2 of the positive electrode current collector are provided with the conductive protective layer 201. A surface of the conductive protective layer 201 disposed on the active layer region away from the positive electrode current collector 100 is provided with the positive electrode active layer 300. Surfaces of the conductive protective layer disposed on the first end region and the second end region are not provided with the insulating protective layer.

The present disclosure does not impose strict restrictions on a disposing method of the protective layer on the functional surface of the positive electrode current collector 100. In a specific implementation, the disposing method may be determined comprehensively according to the safety requirements of the positive electrode plate, the constructions of the positive electrode plate and the production costs of the positive electrode plate.

In addition, the present disclosure does not impose strict restrictions on a forming method of the conductive protective layer 201 disposed on the active layer region of the positive electrode active layer 300. In a specific implementation, when the conductive protective layer 201 is formed at the active layer region a-4 of the positive electrode current collector 100, the positive electrode active layer 300 is formed on a surface of the conductive protective layer 201 away from the positive electrode current collector 100 by coating.

A main component of the protective layer is an inorganic filler. The inorganic filler includes a transition metal oxide containing lithium and/or a ceramic material.

In some embodiments of the present disclosure, the transition metal oxide containing lithium is one or more selected from lithium cobaltate, nickel-cobalt-manganese ternary material, nickel-cobalt-aluminum ternary material, nickel-cobalt-manganese-aluminum quaternary material, lithium ferric phosphate, lithium manganese phosphate, lithium vanadium phosphate, lithium manganese oxide, and lithium-rich manganese-based.

The ceramic material is one or more selected from aluminium oxide, boehmite, zirconium dioxide, titanium dioxide, silicon dioxide, montmorillonite, magnesium oxide and magnesium hydroxide.

According to a research of an inventor of the present disclosure, it is found that the influence of different materials on the safety of the positive electrode plate is different. For example, when the protective layer contain a ceramic material of aluminium oxide, its safety performance is superior to the protective layer which contains transition metal oxide containing lithium; and when the transition metal oxide containing lithium is lithium ferric phosphate, its safety performance is superior to the protective layer which contains nickel-cobalt-manganese ternary material.

The inventor of the present disclosure also found that a median particle size $D_{50}$ of the inorganic filler also has a certain impact on the safety performance of the lithium ion battery, and a smaller $D_{50}$ is conducive to improving the safety of the lithium ion battery. Therefore, the $D_{50}$ of the inorganic filler should be less than the $D_{50}$ of the active substance in the positive electrode active layer.

In some embodiments of the present disclosure, the $D_{50}$ of the inorganic filler is 0.1 to 6 μm and the $D_{50}$ of the positive active substance is 10 to 30 μm.

The inventor of the present disclosure further found that when a bonding force between the protective layer and the positive electrode current collector is greater than a bonding force between the protective layer and the positive electrode active layer, and/or, the bonding force between the protective layer and the positive electrode current collector is greater than a bonding force between particles of the active substance in the positive electrode active layer, the surface of the positive electrode current collector may be well protected by the protective layer in a situation of a mechanical abuse (such as needling, heavy impact), and is not easy to be exposed, so that a contact probability between the positive electrode current collector and the negative electrode plate is reduced, thereby reducing a probability of a short circuit between the positive electrode current collector and the negative electrode plate and improving the safety of the battery.

In some embodiments of the present disclosure, the bonding force between the protective layer and the positive electrode current collector is greater than 30 N/m.

In some embodiments of the present disclosure, the bonding force between the protective layer and the positive electrode current collector is 35-300 N/m.

In some embodiments of the present disclosure, the bonding force between the protective layer and the positive electrode current collector is 35-200 N/m.

Those skilled in the art should know that the bonding force between the protective layer and the positive electrode active layer and the bonding force between the particles of the active substance in the positive electrode active layer are mainly provided by a binder. Therefore, in order to increase the bonding force between the protective layer and the positive electrode current collector, it is useful to raise a content of the binder of the protective layer, which means that, it is useful to make a mass fraction of the binder in the protective layer greater than a mass fraction of the binder in the positive electrode active layer.

In order to further check whether the content of the binder of the protective layer is appropriate, the present disclosure also provides a method for testing the bonding force. For example, in some embodiments of the present disclosure, after the protective layer is stripped from a surface of the positive electrode current collector, total mass of a residual protective layer on the positive electrode current collector accounts for more than 10% of total mass of the protective layer on the positive electrode current collector before stripping.

In some embodiments of the present disclosure, after the protective layer is stripped from a surface of the positive electrode current collector, total area of a residual protective layer on the positive electrode current collector accounts for more than 70% of total area of the protective layer on the positive electrode current collector before stripping.

Understandably, the protective layer described above includes the conductive protective layer and the insulating protective layer, namely the whole protective layer disposed on the functional surface of the positive electrode current collector 100.

In conclusion, components of the protective layer have a great impact on the safety of the lithium ion battery. Comprehensively considering the performance of the lithium ion battery, the present disclosure also imposes a limitation on the content of each component in the protective layer. Specifically, the conductive protective layer contains 50%-98% of an inorganic filler, 0.5%-10% of a first conductive agent and 1.5%-50% of a first binder by a mass percentage; the insulating protective layer contains 50%-96% of a ceramic material and 4%-50% of a second binder by a mass percentage; and the positive electrode active layer contains 93%-99% of the positive electrode active material, 0.5% to 5% of a second conductive agent and 0.5% to 2% of the binder by a mass percentage. Understandably, the first, second, third defined by the present disclosure is mainly used to distinguish adding positions of the conductive agent and the binder, and the material used may be the same or different. For example, the first binder, the second binder and the third binder may all be polyvinylidene fluoride, and a difference may lie in different positions and/or different content.

The positive electrode active material includes one or more of lithium cobaltate (LCO), nickel-cobalt-manganese ternary material (NCM), nickel-cobalt-aluminum ternary material (NCA), nickel-cobalt-manganese-aluminum quaternary material (NCMA), lithium ferric phosphate (LFP), lithium manganese phosphate (LMP), lithium vanadium phosphate (LVP) and lithium manganese oxide (LMO). The conductive agent includes one or more of conductive carbon black, carbon nanotube and graphene. The binder includes one or both of polyvinylidene fluoride and modified polyvinylidene fluoride.

Understandably, a thickness of the protective layer 200 has a certain impact on the performance of the positive electrode plate, and a thicker protective layer is not conducive to energy density of the lithium ion battery. Generally, the thickness of the protective layer is 1%-50% of the thickness of the positive electrode active layer.

In a process of research, an inventor found that when the thickness of the conductive protective layer disposed on the first end region ranges from 1 μm to 25 μm, the thickness of the conductive protective layer disposed on the second end region ranges from 1 μm to 25 μm, and the thickness of the conductive protective layer disposed on the active layer region ranges from 1 μm to 10 μm, the positive electrode plate may be protected by the protective layer effectively and the influence of the protective layer on the comprehensive performance of the positive electrode plate may be reduced.

In order to facilitate preparation of the positive electrode plate, the thickness of the conductive protective layer disposed on the first end region and/or the second end region and at the active layer region is the same, that is, after size of conductive protective layer is prepared, those skilled in the art may coat the size of conductive protective layer on at least one functional surface of the positive electrode current collector to form the conductive protective layer.

In some embodiments of the present disclosure, a thickness of the insulating protective layer a surface of the conductive protective layer disposed on the first end region away from the positive electrode current collector ranges from 1 μm to 15 μm. A thickness of the insulating protective layer a surface of the conductive protective layer disposed on the second end region away from the positive electrode current collector ranges from 1 μm to 15 μm.

In some embodiments of the present disclosure, a thickness of the positive electrode active layer 300 is 50-100 μm.

In addition, the present disclosure does not impose strict restrictions on the thickness of the conductive protective layer 201 and the insulating protective layer 202 disposed on different regions, and those skilled in the art may choose appropriate thickness according to actual production needs or electrode sheet preparation needs. Taking FIG. 8 as an example, the thickness L1 and L2 of the conductive protective layer 201 disposed on the two first end regions of the two functional surfaces of the positive electrode current collector 100 may be the same or different. The thickness L3 and L4 of the conductive protective layer 201 disposed on the two active layer regions of the two functional surfaces of the positive electrode current collector 100 may be the same or different. The thickness L5 and L6 of the conductive protective layer 201 disposed on the two second end regions of the two functional surfaces of the positive electrode current collector 100 may be the same or different. The thickness L1, L3 and L5 of the conductive protective layer disposed on the first end region and/or the second end region, and the active layer region of the same functional surface of the positive electrode current collector 100 may be the same or different. Understandably, sizes of L1, L2, L3, L4, L5 and L6 are independent of each other during a design of the positive electrode plate. In a specific implementation, the sizes of L1, L2, L3, L4, L5 and L6 may be determined according to construction requirements of the positive electrode plate.

According to the lithium ion battery described above, at least one functional surface of the positive electrode current collector further includes an installation region exposing the positive electrode current collector. The installation region is connected to a side of the positive electrode current collector.

Figure 12:
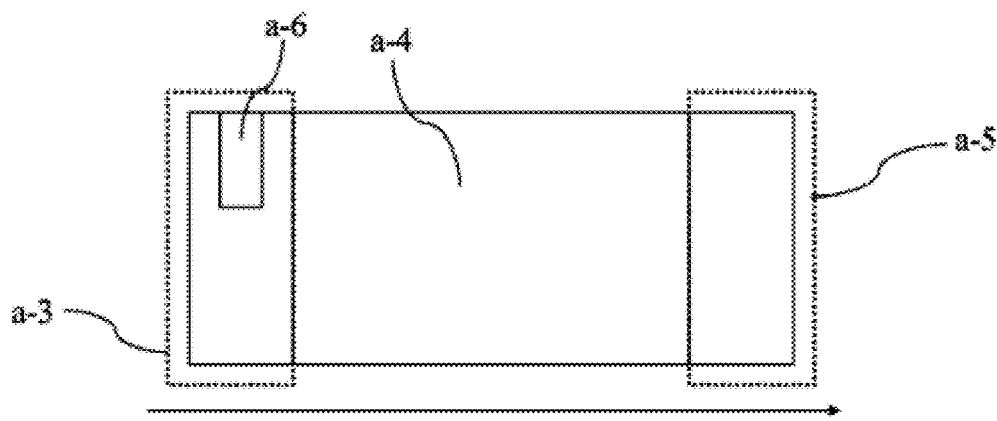
FIG. 12 is a structural schematic diagram of Embodiment 4 of a positive electrode current collector according to the present disclosure.

FIG. 12 is a structural schematic diagram of Embodiment 4 of a positive electrode current collector according to the present disclosure. As shown in FIG. 12, at least one functional surface of a positive electrode current collector 100 further includes an installation region a-6. The installation region a-6 is disposed on the first end region a-3. The installation region a-6 is connected to a side of the positive electrode current collector 100. The side of the positive electrode current collector refers to four sides of the positive electrode current collector with a smaller area, specifically refers to a plane formed by the length and height, or width and height of the current collector.

The installation region a-6 is connected to a side of the positive electrode current collector 100 so that a positive battery tab 400 may be disposed on the positive electrode current collector 100. Namely, the positive electrode plate further includes a positive battery tab. The positive battery tab is disposed on the installation region of a functional surface of the positive electrode current collector. A side of the installation region close to a winding center and a side of the installation region away from the winding center are both provided with the protective layer.

Figure 13:
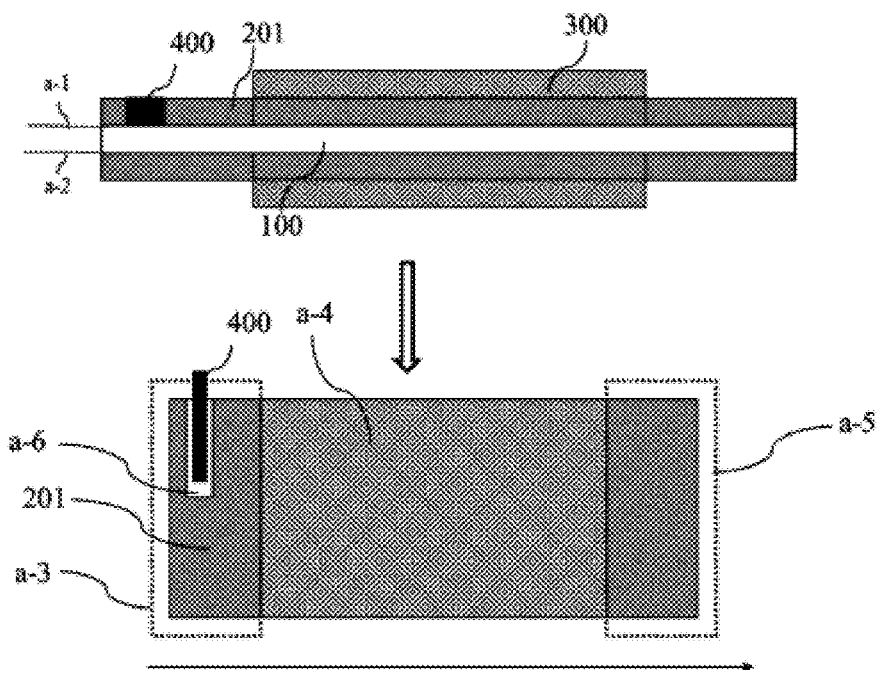
FIG. 13 is a structural schematic diagram of Embodiment 8 of a positive electrode plate according to the present disclosure.

FIG. 13 is a structural schematic diagram of Embodiment 8 of a positive electrode plate according to the present disclosure. As shown in FIG. 13, the positive electrode plate includes a positive battery tab 400, which is disposed on the installation region a-6 and connected to a surface of the positive electrode current collector 100, and the positive battery tab 400 is disposed on the first end region a-3, which is close to a head region of the positive electrode plate.

Understandably, the installation region a-6 may also be disposed on the active layer region a-4. Those skilled in the art may set a position of the installation region according to a position of the electrode battery tab.

The present disclosure does not impose strict restrictions on a shape of the installation region a-6. In a specific embodiment, the size and the shape of the installation region a-6 may be preset according to the positive battery tab 400. For example, in some embodiments, the positive battery tab 400 is selected as a chip-type electrode battery tab commonly used in the field, and the shape of installation region a-6 may be a rectangle.

The present disclosure does not impose strict restrictions on the positive battery tab 400. For example, the positive battery tab 400 may be an aluminum electrode battery tab commonly used in the field. The present disclosure does not impose strict restrictions on a manner in which the positive battery tab 400 is disposed on the installation region a-6. For example, the positive battery tab 400 may be disposed at the installation region a-6 by welding.

Figure 14:
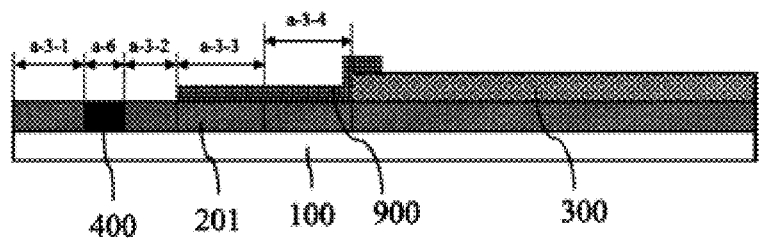
FIG. 14 is a structural schematic diagram of Embodiment 9 of a positive electrode plate according to the present disclosure.

According to the lithium ion battery described above, in order to prevent powder shedding from the protective layer, a surface of the positive electrode plate close to the winding center is pasted with a first taping 900. A first end region may be divided into a first flat region, an installation region, a second flat region, a third flat region and a first arc region according to an adhesive position of the first taping 900. FIG. 14 is a structural schematic diagram of Embodiment 9 of a positive electrode plate according to the present disclosure. As shown in FIG. 14, the first end region a-3 is divided into the first flat region a-3-1, the installation region a-6, the second flat region a-3-2, the third flat region a-3-3 and the first arc region a-3-4 from a side of the positive electrode current collector near the winding center. The first arc region a-3-4 and the active layer region a-4 are connected end to end. The regions described above are divided according to the adhesive position of the taping and the winding way of the positive electrode plate. In order to facilitate the bonding between the first taping and the protective layer, there should be a certain distance between the first taping 900 and the positive battery tab 400, and the first taping covers the position of the winding arc of the positive electrode plate until it is bonded to the positive electrode active layer, that is, the first taping 900 is bonded to the surface of the protective layer disposed on the third flat region a-3-3, the surface of the protective layer disposed on the first arc region a-3-4 and at least part of the surface of the positive electrode active layer 300 disposed on the active layer region.

Figure 15:
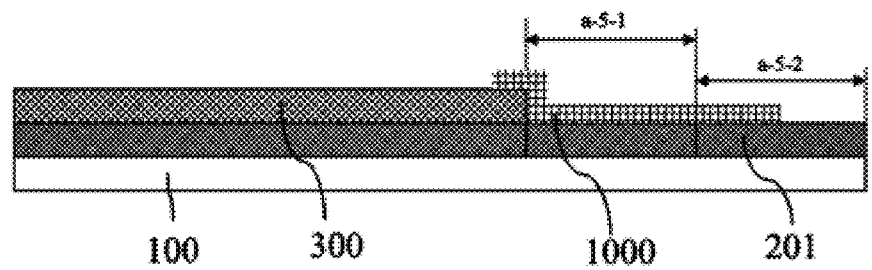
FIG. 15 is a structural schematic diagram of Embodiment 10 of a positive electrode plate according to the present disclosure.

A surface of the positive electrode plate away from the winding center is pasted with a second taping 1000. The second end region may be divided into a second arc region and a fourth flat region according to the adhesive position of the second taping 1000. FIG. is the structural diagram of Embodiment 10 of a positive electrode plate according to the present disclosure. As shown in FIG. 15, the second end regions of the two functional surfaces of the positive electrode current collector 100 are divided into the second arc region a-5-1 and the fourth flat region a-5-2 along the winding direction of the positive electrode current collector. The second arc region a-5-1 is connected with the active layer region a-4. The second circular arc region a-5-1 and the fourth flat area a-5-2 are divided according to the position of the second taping and the winding way of the positive electrode plate. In order to facilitate the bonding between the second taping and the protective layer, the second taping 1000 should be bonded to part of the surface of the positive electrode active layer, and cover the position of the winding arc of the positive electrode plate, that is, the second taping 1000 is bonded to at least part of the surface of the positive electrode active layer disposed on the active layer region a-4, the surface of the protective layer disposed on the second arc region a-5-1 and at least part of the surface of the protective layer disposed on the fourth flat region a-5-2.

Understandably, the protective layer shown in FIG. 14 to FIG. 15 is the conductive protective layer 201. When an insulating protective layer is provided on the surface of the conductive protective layer 201 away from the positive electrode current collector 101, the first taping and the second taping are bonded to the surface of the insulating protective layer.

It is known to those skilled in the art that the positive electrode plate, the separator and the negative electrode plate which are wound into shape need to be bonded with a shell to obtain the lithium ion battery. However a bonding force between the protective layer and adhesive tape is limited, thus at least one functional surface of the positive electrode current collector includes an empty foil region. The empty foil region is disposed on an end of the second end region away from a winding center. And a surface of the empty foil region is not provided with the protective layer, that is, at least part of the positive electrode current collector 100 is exposed in order to bond with the shell and improve the bonding strength.

Figure 16:
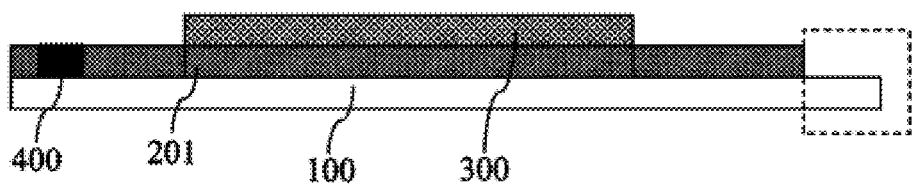
FIG. 16 is a structural schematic diagram of Embodiment 11 of a positive electrode plate according to the present disclosure.

FIG. 16 is a structural schematic diagram of Embodiment 11 of a positive electrode plate according to the present disclosure. As shown in FIG. 16, the positive electrode current collector 100 includes a first end region, an active layer region, a second end region and an empty foil region (portion in the dashed box) along the winding direction. The first end region, the active layer and the second end region are provided with a conductive protective layer 201. The surface of the conductive protective layer 201 disposed on the active layer region away from the positive electrode current collector 100 is provided with a positive electrode active layer 300. The first end region includes an installation region. A positive battery tab 400 is disposed on the installation region. The surface of the empty foil region is not provided with the protective layer and the positive electrode active layer, and the positive electrode current collector 100 is exposed.

In addition, the two functional surfaces of the positive electrode current collector away from the end of the winding center may also not include the empty foil region, that is, the two functional surfaces of the positive electrode current collector 100 includes the first end region, the active layer region, the second end region along the winding direction successively, excluding the empty foil region.

The lithium ion battery further includes a separator 800, which is disposed between the positive electrode plate and negative electrode plate and used for isolating the positive electrode plate and negative electrode plate. The separator may be made of conventional materials in this field, which is not further described in the present disclosure.

The lithium ion battery further includes a negative electrode plate, including a negative electrode current collector and a negative electrode active layer disposed on at least one functional surface of the negative electrode current collector. In order to prevent lithium from being precipitated from the negative electrode active layer, a length of the negative electrode active layer is greater than a length of the positive electrode active layer.

It is known to those skilled in the art that a preparation process of the negative electrode plate includes: preparing size of negative electrode active layer and coating it on at least one functional surface of the negative electrode current collector to obtain the negative electrode active layer and then the negative electrode plate. In order to prevent the size of negative electrode active layer from trailing during a coating process, the preparation process of the negative electrode plate is simplified. At least one functional surface of the negative electrode current collector includes an empty foil region. The empty foil region is located at the end of the negative electrode current collector away from the winding center. The surface of the empty foil region is not provided with the negative electrode active layer, namely the negative electrode current collector at the end of the winding center is exposed. In the preparation process of the negative electrode plate, a length of coating of the size of negative electrode active layer may be controlled to be less than a length of the negative electrode current collector, which facilitate the size of negative electrode active layer being completely loaded by the negative electrode current collector.

In addition, neither of two functional surfaces at an end of the negative electrode current collector away from a winding center includes an empty foil region. In the preparation process of the negative electrode plate, an excess negative electrode current collector may be removed after the coating of the size of negative electrode active layer is completed.

Figure 17:
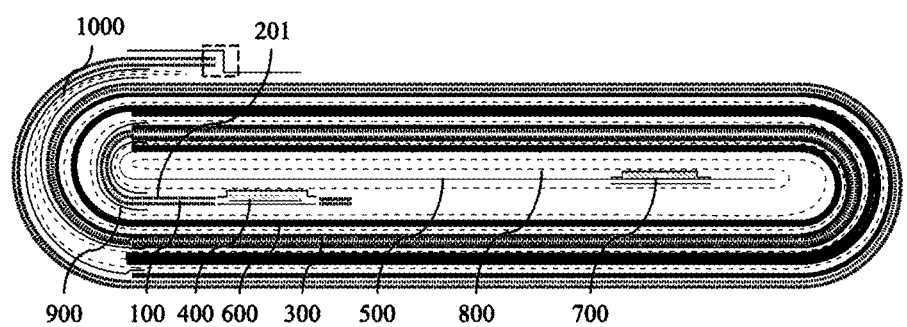
FIG. 17 is a structural schematic diagram of Embodiment 2 of a lithium ion battery according to the present disclosure.

On the basis of content disclosed above, those skilled in the art may prepare size of protective layer and size of positive electrode active layer according to requirements of the craft, coat the size of positive electrode active layer on the surface of the positive electrode current collector to obtain the positive electrode plate, prepare size of negative electrode active layer, coat the size of negative electrode active layer on the surface of the negative electrode current collector to obtain the negative electrode plate, and perform winding operation in combination with the separator to obtain the lithium ion battery. FIG. 17 is a structural schematic diagram of Embodiment 2 of a lithium ion battery according to the present disclosure. As shown in FIG. 17, the lithium ion battery includes a positive electrode plate, a separator 800 and a negative electrode plate formed by winding from inside to outside. The positive electrode plate includes a positive electrode current collector 100, conductive protective layers 201 disposed on two functional surfaces of the positive electrode current collector, and a positive electrode active layer 300 disposed on a surface of the conductive protective layer 201 disposed on the positive layer region away from the positive electrode current collector 100. The first end region includes an installation region. The positive battery tab 400 is disposed on the installation region and connected with the positive electrode current collector. A side of the positive electrode current collector close to the winding center and a side of the positive electrode current collector away from the winding center are pasted respectively with a first taping 900 and a second taping 1000, and the end of the positive electrode current collector 100 away from the winding center further includes an empty foil region (portion in the dashed box).

Figure 18:
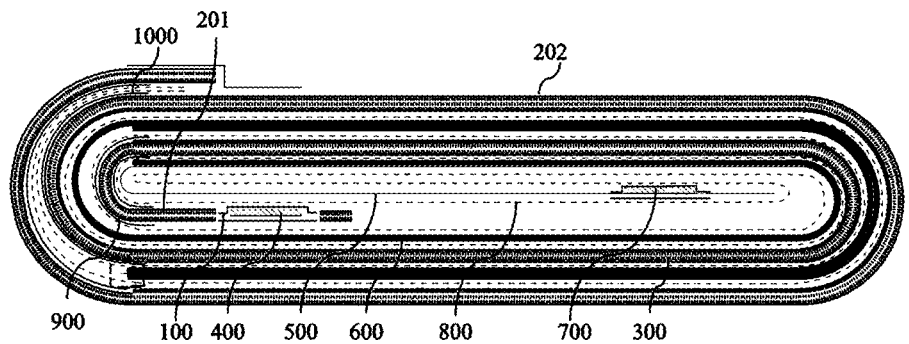
FIG. 18 is a structural schematic diagram of Embodiment 3 of a lithium ion battery according to the present disclosure.

FIG. 18 is a structural schematic diagram of Embodiment 3 of a lithium ion battery according to the present disclosure. As shown in FIG. 18, a basic structure is the same as the Embodiment 2 and a difference is that the positive electrode plate further includes an insulating protective layer, that is, the structure of the positive electrode plate may be referred to FIG. 9. The structure of the negative electrode plate in the above two lithium ion battery structures is basically the same, that is, the negative electrode plate includes a negative electrode current collector 500 and a negative electrode active layer 600. A negative battery tab 700 is disposed on a side of the negative electrode current collector 500 close to the winding center. A length of the negative electrode active layer 600 is greater than a length of the positive electrode active layer 300, and an end of the negative electrode current collector 500 away from the winding center includes an empty foil region (portion in the dashed box of FIG. 18).

In the following, the lithium ion battery provided by the present disclosure is introduced in detail through specific embodiments.

Embodiment 1

The lithium ion battery provided in the embodiment includes a positive electrode plate, a separator and a negative electrode plate which are formed by winding.

The positive electrode plate includes a positive electrode current collector, a conductive protective layer, a positive electrode active layer and an electrode battery tab. The positive electrode current collector includes a first end region, an installation region, an active layer region, a second end region and an empty foil region which are successively disposed along the winding direction. The conductive protective layer is disposed on the active layer region and the second end region of the two functional surfaces of the positive electrode current collector. The positive battery tab is disposed on the installation region and connected with the positive electrode current collector, and the positive electrode active layer is disposed on the surface of the conductive protective layer disposed on the active layer region away from the positive electrode current collector.

The surface of the conductive protective layer disposed on the first end region and the second end region of the positive electrode plate is pasted with the first taping and the second taping respectively.

The preparation process of the positive electrode plate includes the following processes.

Step 1. Dissolving lithium ferric phosphate, polyvinylidene fluoride and carbon black in N-methylpyrrolidone according to a mass ratio 58:38:4 of dry powder and stirring evenly to form conductive protective size. The $D_{50}$ of lithium ferric phosphate is 0.8 μm.

Step 2. Coating the conductive protective size on the two active layer regions and two second end regions of the two functional surfaces of the positive electrode current collector by a gravure coating method to form two conductive protective layers. A thickness of the conductive protective layer is 5 μm.

The positive electrode current collector is made of aluminum foil.

Step 3. Dissolving lithium cobaltate, polyvinylidene fluoride and carbon black in N-methylpyrrolidone according to the mass ratio 97:1.5:1.5 of dry powder and stirring evenly to form the positive active size. The $D_{50}$ of lithium cobaltate is 15 μm.

Step 4. Coating the positive active size on the surface of the conductive protective layer disposed on the two active layer regions away from the positive electrode current collector by the gravure coating method to form two positive electrode active layer, and then performing drying, rolling, cutting and making into sheet on the positive electrode current collector to obtain the positive electrode plate, A thickness of the two positive electrode active layer is 87 μm.

The prepared positive electrode plate combined with a conventional negative electrode plate in the field, a separator and electrolyte is made into the lithium ion battery according to a conventional lithium battery production process. The battery capacity is about 4970 mAh.

Embodiment 2

The structure of the lithium ion battery provided in this embodiment is basically the same as that in Embodiment 1. The difference is that the conductive protective layer is disposed on the first end region, the active layer region and the second end region on the two functional surfaces of the positive electrode current collector.

The preparation process of the positive electrode plate in this embodiment is basically the same as that in Embodiment 1. The difference is that Step 2 of this embodiment further includes: coating the conductive protective size at the two first end regions on the two functional surfaces of the positive electrode current collector to form a conductive protective layer. A thickness of the conductive protective layer is 5 μm.

Embodiment 3

The structure and the preparation process of the positive electrode plate in this embodiment is basically the same as that in Embodiment 2. The difference is that the thickness of the conductive protective layer disposed on the second end region in Step 2 of this Embodiment 3 is 15 μm.

Embodiment 4

The structure and the preparation process of the positive electrode plate in this embodiment is basically the same as that in Embodiment 2. The difference is that the thickness of the conductive protective layer disposed on the first end region and the second end region in Step 2 of Embodiment 4 is 15 μm.

Embodiment 5

The structure of the lithium ion battery provided in this embodiment is basically the same as that in Embodiment 1. The difference is that the surface of the conductive protective layer disposed on the second end region away from the positive electrode current collector is also provided with an insulating protective layer.

The preparation process of the positive electrode plate in this embodiment is basically the same as that in Embodiment 1. The difference is that the following steps are also included.

1. Dissolving alumina, polyvinylidene fluoride according to the mass ratio 88:12 of dry powder in N-methylpyrrolidone and stirring evenly to form insulating protective size. The $D_{50}$ of alumina is 1.2 μm.
2. Coating the insulating protective size on the surface of the two conductive protective layer disposed on the second end regions away from the positive electrode current collector by a gravure coating method to form an insulating protective layer. A thickness of the insulating protective layer is 10 μm.

Embodiment 6

The structure of the lithium ion battery provided in this embodiment is basically the same as that in Embodiment 5. The difference is that the conductive protective layer is disposed on the first end region, the active layer region and the second end region on the two functional surfaces of the positive electrode current collector. The surface of the conductive protective layer disposed on the first end region away from the positive electrode current collector is provided with an insulating protective layer.

The preparation process of the positive electrode plate in this embodiment is basically the same as that in Embodiment 5. The difference is that Step 2 of this embodiment 6 further includes: coating the conductive protective size at the two first end regions on the two functional surfaces of the positive electrode current collector to form a conductive protective layer with a thickness of 5 μm; and coating the insulating protective size on the surface of the conductive protective layer disposed on the first end region away from the positive electrode current collector to form an insulating protective layer with a thickness of 5 μm.

Embodiment 7

The structure and the preparation process of the positive electrode plate in this embodiment is basically the same as that in Embodiment 6. The difference is that the thickness of the insulating protective layer in Step 2 of Embodiment 7 is 15 μm.

Embodiment 8

The structure of the positive electrode plate in this embodiment is the same as that in Embodiment 4, and the preparation process of the positive electrode plate in this embodiment is basically the same as that in Embodiment 4.

The difference is that in Step 1, the mass ratio of dry powder of lithium ferric phosphate, polyvinylidene fluoride and carbon black is 69:28:3.

Embodiment 9

The structure of the positive electrode plate in this embodiment is basically the same as that in Embodiment 8. The difference is that it further includes a conductive protective layer provided on the surface of the conductive protective layer disposed on the first end region and the second end region away from the positive electrode current collector.

The preparation process of the positive electrode plate provided in this embodiment is basically the same as that in Embodiment 8. The difference is that the thickness of the insulating protective layer is 10 μm.

Embodiment 10

The structure of the positive electrode plate in this embodiment is the same as that in Embodiment 8, and the preparation process of the positive electrode plate in this embodiment is basically the same as that in Embodiment 8. The difference is that in Step 1, the mass ratio of dry powder of lithium ferric phosphate, polyvinylidene fluoride and carbon black is 85:10:5.

Embodiment 11

The structure and the preparation process of the positive electrode plate in this embodiment is basically the same as that in Embodiment 10. The difference is that a thickness of the conductive protective layer disposed on the active layer region is 10 μm.

Embodiment 12

The structure of the lithium ion battery provided in this embodiment is basically the same as that in Embodiment 10. The difference is that the conductive protective layer is disposed on the active layer region and the second end region on the two functional surfaces of the positive electrode current collector, and the surface of the conductive protective layer disposed on the second end region away from the positive electrode current collector is provided with an insulating protective layer.

The preparation process of the positive electrode plate in this embodiment is basically the same as that in Embodiment 10. The difference is that Step 2 of this embodiment does not include: coating the conductive protective size at the two first end regions on the two functional surfaces of the positive electrode current collector; but include: coating the insulating protective size on the surface of the conductive protective layer disposed on the second end region away from the positive electrode current collector to form an insulating protective layer with a thickness of 5 μm.

Embodiment 13

The structure of the lithium ion battery in this embodiment is the same as that in Embodiment 10, and the preparation process of the lithium ion battery in this embodiment is basically the same as that in Embodiment 10. The difference is that in Step 3, the mass ratio of dry powder of lithium cobalate, polyvinylidene fluoride and carbon black is 85:10:5.

Embodiment 14

The structure of the lithium ion battery in this embodiment is the same as that in Embodiment 13, and the preparation process of the positive electrode plate in this embodiment is basically the same as that in Embodiment 13. The difference is that in Step 1, the mass ratio of dry powder of lithium ferric phosphate, polyvinylidene fluoride and carbon black is 97:1.5:1.5.

Embodiment 15

The structure of the lithium ion battery in this embodiment is the same as that in Embodiment 10, and the preparation process of the lithium ion battery in this embodiment is basically the same as that in Embodiment 10. The difference is that the inorganic filler in Step 1 is alumina.

Embodiment 16

The structure of the lithium ion battery in this embodiment is the same as that in Embodiment 15, and the preparation process of the lithium ion battery in this embodiment is basically the same as that in Embodiment 15. The difference is that the $D_{50}$ of inorganic filler of alumina in Step 1 is 0.5 μm.

Embodiment 17

The structure of the lithium ion battery in this embodiment is the same as that in Embodiment 10, and the preparation process of the lithium ion battery in this embodiment is basically the same as that in Embodiment 10. The difference is that the inorganic filler in Step 1 are lithium ferric phosphate and alumina, the mass ratio of lithium ferric phosphate and alumina is 1:1, the $D_{50}$ of lithium ferric phosphate is 0.8 μm, and the $D_{50}$ of alumina is 0.5 μm.

Embodiment 18

The structure of the lithium ion battery in this embodiment is the same as that in Embodiment 10, and the preparation process of the lithium ion battery in this embodiment is basically the same as that in Embodiment 10. The difference is that the $D_{50}$ of the inorganic filler of lithium ferric phosphate in Step 1 is 4 μm.

Embodiment 19

The structure of the lithium ion battery in this embodiment is the same as that in Embodiment 10, and the preparation process of the lithium ion battery in this embodiment is basically the same as that in Embodiment 10. The difference is that the inorganic filler in Step 1 is lithium nickel cobalt manganese oxide and the $D_{50}$ of the lithium nickel cobalt manganese oxide is 4 μm.

Embodiment 20

The lithium ion battery provided in this embodiment may be referred to Embodiment 1. The difference is that the two functional surfaces of the positive electrode current collector include the first end region, the installation region, the active layer region, and the second end region successively along the winding direction and the active layer region and the second end region are provided with conductive safety coatings.

Comparative Embodiment 1

The lithium ion battery provided in this comparative embodiment includes a positive electrode plate, a separator and a negative electrode plate which are formed by winding. The positive electrode plate includes a positive electrode current collector, a conductive protective layer disposed on the region of a positive electrode active layer and the positive electrode active layer disposed on the surface of the conductive protective layer away from the positive electrode current collector. A preparation method of the positive electrode plate includes the following steps.

Step 1. Dissolving lithium ferric phosphate, polyvinylidene fluoride and carbon black in N-methylpyrrolidone according to a mass ratio 58:38:4 of dry powder and stirring evenly to form protective size.

Step 2. Coating the protective size on the two functional surfaces of the positive electrode current collector by a gravure coating method to form two conductive protective layers. A thickness of the conductive protective layer is 5 μm.

The positive electrode current collector is made of aluminum foil.

Step 3. Preparing positive electrode active size, coating the active size on surfaces of the two conductive protective layer away from the positive electrode current collector by a coating method to form two positive electrode active layers, and then performing drying, rolling, cutting and making into sheet on the positive electrode current collector to obtain the positive electrode plate.

A thickness of the two positive electrode active layer is 87 μm.

Table 1-1 and Table 1-2 list positive electrode plates of Embodiments 1-20 and Comparative Embodiment 1 to make the difference between positive electrode plates provided by Embodiments 1-20 and Comparative Embodiment 1 more intuitive.

TABLE 1-1

Description of the positive electrode plates provided by Embodiments 1-20 and Comparative Embodiment 1

| Type | Thickness of the conductive protective layer disposed on the first end region (μm) | Thickness of the conductive protective layer disposed on the second end region (μm) | Thickness of the conductive protective layer disposed on the active layer region (μm) | Thickness of the insulating protective layer disposed on the surface of the conductive protective layer disposed on the first end region (μm) | Thickness of the insulating protective layer disposed on the surface of the conductive protective layer disposed on the second end region (μm) |
|---|---|---|---|---|---|
| Embodiment 1 | / | 5 | 5 | / | / |
| Embodiment 2 | 5 | 5 | 5 | / | / |
| Embodiment 3 | 5 | 15 | 5 | / | / |
| Embodiment 4 | 15 | 15 | 5 | / | / |
| Embodiment 5 | / | 5 | 5 | / | 10 |
| Embodiment 6 | 5 | 5 | 5 | 5 | 10 |
| Embodiment 7 | 5 | 5 | 5 | 15 | 15 |
| Embodiment 8 | 15 | 15 | 5 | / | / |
| Embodiment 9 | 15 | 15 | 5 | 10 | 10 |
| Embodiment 10 | 15 | 15 | 5 | / | / |
| Embodiment 11 | 15 | 15 | 10 | / | / |
| Embodiment 12 | / | 15 | 5 | / | 5 |
| Embodiment 13 | 15 | 15 | 5 | / | / |
| Embodiment 14 | 15 | 15 | 5 | / | / |
| Embodiment 15 | 15 | 15 | 5 | / | / |
| Embodiment 16 | 15 | 15 | 5 | / | / |
| Embodiment 17 | 15 | 15 | 5 | / | / |
| Embodiment 18 | 15 | 15 | 10 | / | / |
| Embodiment 19 | 15 | 15 | 10 | / | / |
| Embodiment 20 | / | 5 | 5 | / | / |
| Comparative Embodiment 1 | / | / | 5 | / | / |

TABLE 1-2

Description of the positive electrode plates provided by Embodiments 1-20 and Comparative Embodiment 1

| Type | Type of the inorganic filler in conductive protective layer | Particle size of the inorganic filler | Ratio of various components in size of the protective layer (inorganic filler:binder:conductive agent) | Ratio of various components in size of the positive electrode active layer (inorganic filler:binder:conductive agent) |
|---|---|---|---|---|
| Embodiment 1 | LFP | 0.8 | 58:38:04 | 97:1.5:1.5 |
| Embodiment 2 | LFP | 0.8 | 58:38:04 | 97:1.5:1.5 |
| Embodiment 3 | LFP | 0.8 | 58:38:04 | 97:1.5:1.5 |
| Embodiment 4 | LFP | 0.8 | 58:38:04 | 97:1.5:1.5 |
| Embodiment 5 | LFP | 0.8 | 58:38:04 | 97:1.5:1.5 |
| Embodiment 6 | LFP | 0.8 | 58:38:04 | 97:1.5:1.5 |

TABLE 1-2-continued

Description of the positive electrode plates provided
by Embodiments 1-20 and Comparative Embodiment 1

| Type | Type of the inorganic filler in conductive protective layer | Particle size of the inorganic filler | Ratio of various components in size of the protective layer (inorganic filler:binder:conductive agent) | Ratio of various components in size of the positive electrode active layer (inorganic filler:binder:conductive agent) |
|---|---|---|---|---|
| Embodiment 7 | LFP | 0.8 | 58:38:04 | 97:1.5:1.5 |
| Embodiment 8 | LFP | 0.8 | 69:28:03 | 97:1.5:1.5 |
| Embodiment 9 | LFP | 0.8 | 69:28:03 | 97:1.5:1.5 |
| Embodiment 10 | LFP | 0.8 | 85:10:05 | 97:1.5:1.5 |
| Embodiment 11 | LFP | 0.8 | 85:10:05 | 97:1.5:1.5 |
| Embodiment 12 | LFP | 0.8 | 85:10:05 | 97:1.5:1.5 |
| Embodiment 13 | LFP | 0.8 | 85:10:05 | 85:10:05 |
| Embodiment 14 | LFP | 0.8 | 97:1.5:1.5 | 85:10:05 |
| Embodiment 15 | $Al_2O_3$ | 0.8 | 85:10:05 | 97:1.5:1.5 |
| Embodiment 16 | $Al_2O_3$ | 0.8 | 85:10:05 | 97:1.5:1.5 |
| Embodiment 17 | LFP + $Al_2O_3$ | 0.8 + 0.5 | 85:10:05 | 97:1.5:1.5 |
| Embodiment 18 | LFP | 4 | 85:10:05 | 97:1.5:1.5 |
| Embodiment 19 | NCM | 4 | 85:10:05 | 97:1.5:1.5 |
| Embodiment 20 | LFP | 0.8 | 58:38:4 | 97:1.5:1.5 |
| Comparative Embodiment 1 | LFP | 0.8 | 58:38:4 | 97:1.5:1.5 |

Experimental Embodiment

The lithium ion battery obtained on the basis of Embodiments 1-20 and Comparative Embodiment 1 were tested in an acupuncture test at full-charge and heavy impact test, and test results are shown in Table 2.

1. Acupuncture test at full-charge: putting the lithium ion battery in a room-temperature environment, charging the lithium ion battery at a constant current of 0.5 C until a voltage is 4.45V, then charging the lithium ion battery at a constant voltage until the current drops to 0.025 C, and stopping charging. A steel nail with a diameter of 4 mm is used to vertically pass through a center of the lithium ion battery at a speed of 30 mm/s, and the steel nail is kept in the lithium ion battery for 300 s. If the lithium ion battery does not catch fire or explode, it is marked as passing. Fifteen lithium ion batteries were tested for each embodiment, and a passing rate of the acupuncture test at full-charge is a ratio of the number of lithium ion batteries that passed the acupuncture test at full-charge to 15.
2. Heavy impact test: putting the lithium ion battery in a room-temperature environment, charging the lithium ion battery at a constant current of 0.2 C until a voltage is 4.45 V, then charging the lithium ion battery at a constant voltage until the current drops to 0.025 C, and stopping charging, and then discharging the lithium ion battery at a constant current of 0.5 C until the voltage drops to 3.0 V. The cycle described above was repeated for 5 times, and the heavy impact test was carried out within 24 hours after the last time that the battery was fully charged. The lithium ion battery was placed on a plane, and a steel column with a diameter of 15.8±0.2 mm was placed in a center of the battery. A vertical axis of the steel column was parallel to the plane. A heavy weight of 9.1±0.1 kg fell freely onto the steel column above the center of the battery from a height of 610±25 mm. If the lithium ion battery does not catch fire or explode within 6 hours of observation, it is marked as passing. Ten lithium ion batteries were tested for each embodiment, and a passing rate of the heavy impact test was a ratio of the number of lithium ion batteries that passed the heavy impact test to 10.

TABLE 2

Results of safety tests for lithium ion batteries provided
by Embodiments 1-20 and Comparative Embodiment 1

| | Ratio of the acupuncture test at full-charge | Ratio of the heavy impact test |
|---|---|---|
| Embodiment 1 | 8/15 | 4/10 |
| Embodiment 2 | 9/15 | 4/10 |
| Embodiment 3 | 10/15 | 5/10 |
| Embodiment 4 | 12/15 | 7/10 |
| Embodiment 5 | 10/15 | 5/10 |
| Embodiment 6 | 11/15 | 5/10 |
| Embodiment 7 | 13/15 | 8/10 |
| Embodiment 8 | 11/15 | 7/10 |
| Embodiment 9 | 14/15 | 10/10 |
| Embodiment 10 | 11/15 | 6/10 |
| Embodiment 11 | 12/15 | 7/10 |
| Embodiment 12 | 12/15 | 6/10 |
| Embodiment 13 | 11/15 | 8/10 |
| Embodiment 14 | 8/15 | 8/10 |
| Embodiment 15 | 13/15 | 9/10 |
| Embodiment 16 | 14/15 | 9/10 |
| Embodiment 17 | 13/15 | 8/10 |
| Embodiment 18 | 12/15 | 6/10 |
| Embodiment 19 | 10/15 | 7/10 |
| Embodiment 20 | 8/15 | 4/10 |
| Comparative Embodiment 1 | 7/15 | 4/10 |

According to Table 2, the following contents may be seen.
1. Compared with the Comparative Embodiment 1, the lithium ion battery of Embodiments 1-20 has a higher pass rate of the acupuncture test at full-charge and a higher pass rate of the heavy impact test. The lithium ion battery of Embodiments 1-20 shows more excellent safety performance in the acupuncture process and the heavy impact process, which indicates that increasing the protective area of the surface of the protective layer of the positive electrode current collector may improve the safety performance of the lithium ion battery with the positive electrode plate in the acupuncture process and the heavy impact process.

2. Compared with Embodiment 1, the lithium ion battery of Embodiments 2-7 has a higher pass rate of the acupuncture test at full-charge and a higher pass rate of the heavy impact test. The pass rate of the acupuncture test at full-charge and the pass rate of the heavy impact test of Embodiment 7 is the best, which indicates that increasing the thickness of the protective layer may improve the safety performance of the lithium ion battery with the positive electrode plate in the acupuncture process and the heavy impact process. Moreover, providing an insulating protective layer on the conductive protective layer may further improve the safety performance of the lithium ion battery with the positive electrode plate in the acupuncture process and the heavy impact process.

3. Compared with Embodiment 4, the pass rates of the acupuncture test at full-charge and the heavy impact test in Embodiment 8 and 10 are reduced, which indicates that increasing the content of the binder in the protective layer may further improve the safety performance of the lithium ion battery with the positive electrode plate in the acupuncture process and the heavy impact process.

4. Compared with Embodiment 10, the pass rate of the acupuncture test at full-charge and the heavy impact test in Embodiment 13 are increased, which is due to the increased content of the binder in the positive electrode active layer, but the excessive content of the binder is not conducive to the electrical performance of the lithium ion battery. The pass rate of the acupuncture test at full-charge in Embodiment 14 is reduced, which indicates that the content of the binder in the protective layer should not be too low; therefore, it is recommended to increase the content of the binder in the protective layer.

5. Compared with Embodiment 10, the pass rates of the acupuncture test at full-charge and the heavy impact test in Embodiments 15-19 are relatively high, which indicates that types of the inorganic filler also have certain differences in the safety test, specifically, alumina>lithium ferric phosphate>nickel-cobalt-manganese ternary material; and the inorganic filler with small particle size is conducive to further improve the safety performance of the lithium ion battery with the positive electrode plate in the acupuncture process and the heavy impact process.

Finally, it should be noted that the above embodiments are used only to describe and not to restrict the technical solution of the present disclosure. Although the present disclosure is described in detail with reference to each of the foregoing embodiments, those skilled in the art shall understand that the technical solution recorded in each of the foregoing embodiments may be modified, or some or all of the technical characteristics may be substituted equivalently; and these modifications or substitutions do not remove the nature of the respective technical solutions from the scope of the technical solutions of the embodiments of the present disclosure.

What is claimed is:

1. A lithium ion battery, comprising
a positive electrode plate, a negative electrode plate, and a separator, the positive electrode plate, the separator and the negative electrode plate being stacked successively and then wound from inside to outside;
wherein the positive electrode plate comprises a positive electrode current collector, at least one functional surface of the positive electrode current collector is provided with a protective layer, a surface of the protective layer away from the positive electrode current collector is provided with a positive electrode active layer, and a length of the protective layer is greater than a length of the positive electrode active layer in a winding direction of the positive electrode current collector;
the at least one functional surface of the positive electrode current collector comprises an installation region exposing the positive electrode current collector, and the installation region is disposed at a side of the positive electrode current collector;
the positive electrode plate further comprises a positive battery tab, the positive battery tab is disposed on the installation region on the at least one functional surface of the positive electrode current collector, and a side of outside the installation region close to a winding center and a side of outside the installation region away from the winding center are both provided with the protective layer; and
the protective layer comprises an inorganic filler, and a D50 of the inorganic filler is less than a D50 of an active substance in the positive electrode active layer,
the at least one functional surface of the positive electrode current collector comprises an active layer region and further comprises a first end region and a second end region;
wherein the protective layer comprises a conductive protective layer, the conductive protective layer is disposed on the first end region, the second end region, and the active layer region, and a surface of the conductive protective layer disposed on the active layer region away from the positive electrode current collector is provided with the positive electrode active layer.

2. The lithium ion battery according to claim 1, wherein the protective layer further comprises an insulating protective layer, and the insulating protective layer is disposed on a surface of the conductive protective layer disposed on the first end region and/or the second end region away from the positive electrode current collector.

3. The lithium ion battery according to claim 2, wherein the insulating protective layer comprises 50%-96% of a ceramic material and 4%-50% of a second binder by a mass percentage.

4. The lithium ion battery according to claim 2, wherein a thickness of the insulating protective layer disposed on a surface of the conductive protective layer disposed on the first end region away from the positive electrode current collector ranges from 1 μm to 15 μm; and a thickness of the insulating protective layer disposed on a surface of the conductive protective layer disposed on the second end region away from the positive electrode current collector ranges from 1 μm to 15 μm.

5. The lithium ion battery according to claim 1, wherein the inorganic filler comprises a transition metal oxide containing lithium and a ceramic material.

6. The lithium ion battery according to claim 5, wherein the transition metal oxide containing lithium is one or more selected from lithium cobaltate, nickel-cobalt-manganese ternary material, nickel-cobalt-aluminum ternary material, nickel-cobalt-manganese-aluminum quaternary material, lithium ferric phosphate, lithium manganese phosphate, lithium vanadium phosphate, lithium manganese oxide, and lithium-rich manganese-based; and the ceramic material is one or more selected from aluminium oxide, boehmite, zirconium dioxide, titanium dioxide, silicon dioxide, montmorillonite, magnesium oxide and magnesium hydroxide.

7. The lithium ion battery according to claim 1, wherein a bonding force between the protective layer and the positive electrode current collector is greater than a bonding force between the protective layer and the positive electrode active layer; and/or
the bonding force between the protective layer and the positive electrode current collector is greater than a bonding force between particles of the active substance in the positive electrode active layer.

8. The lithium ion battery according to claim 1, wherein a mass fraction of a binder in the protective layer is greater than a mass fraction of a binder in the positive electrode active layer.

9. The lithium ion battery according to claim 1, wherein the conductive protective layer comprises 50%-98% of an inorganic filler, 0.5%-10% of a first conductive agent and 1.5%-40% of a first binder by a mass percentage.

10. The lithium ion battery according to claim 1, wherein a thickness of the protective layer is 1%-50% of a thickness of the positive electrode active layer.

11. The lithium ion battery according to claim 1, wherein a thickness of the conductive protective layer disposed on the first end region ranges from 1 μm to 25 μm, a thickness of the conductive protective layer disposed on the second end region ranges from 1 μm to 25 μm, and a thickness of the conductive protective layer disposed on the active layer region ranges from 1 μm to 10 μm.

12. The lithium ion battery according to claim 1, wherein the first end region along the winding direction of the positive electrode current collector comprises a first flat region, an installation region, a second flat region, a third flat region and a first arc region, the installation region is provided with the positive battery tab, a surface of the positive electrode plate is pasted with a first taping, and the first taping is bonded with a surface of the protective layer disposed on the third flat region, a surface of the protective layer disposed on the first arc region and at least part of a surface of the positive electrode active layer disposed on the active layer region.

13. The lithium ion battery according to claim 1, wherein the second end region along the winding direction of the positive electrode current collector comprises a second arc region and a fourth flat region, a surface of the positive electrode plate is pasted with a second taping, and the second taping is bonded with at least part of a surface of the positive electrode active layer disposed on the active layer region, a surface of the protective layer disposed on the second arc region and at least part of a surface of the protective layer disposed on the fourth flat region.

14. The lithium ion battery according to claim 1, wherein the negative electrode plate comprises a negative electrode current collector and a negative electrode active layer disposed on at least one functional surface of the negative electrode current collector, and a length of the negative electrode active layer is greater than a length of the positive electrode active layer.

15. The lithium ion battery according to claim 1, further comprises an aluminum plastic film.

* * * * *